United States Patent [19]

Christensen et al.

[11] Patent Number: 4,852,100
[45] Date of Patent: Jul. 25, 1989

[54] ERROR DETECTION AND CORRECTION SCHEME FOR MAIN STORAGE UNIT

[75] Inventors: Harold F. Christensen, Saratoga; Jeffrey A. Thomas, Cupertino; Jeffrey Isozaki, San Jose; Joseph A. Petolino, Palo Alto, all of Calif.

[73] Assignee: Amdahl Corporation, Sunnyvale, Calif.

[21] Appl. No.: 61,847

[22] Filed: Jun. 11, 1987

Related U.S. Application Data

[63] Continuation-in-part of Ser. No. 920,522, Oct. 17, 1986, Pat. No. 4,761,783.

[51] Int. Cl.[4] .............................................. G06F 11/10
[52] U.S. Cl. ..................................................... 371/38
[58] Field of Search ........................ 371/37, 38, 39, 40

[56] References Cited

U.S. PATENT DOCUMENTS

| | | | |
|---|---|---|---|
| 3,218,612 | 11/1965 | Sorg, Jr. et al. | 371/38 |
| 3,825,893 | 7/1974 | Bossen et al. | 371/38 |
| 3,836,957 | 9/1974 | Duke et al. | 371/38 |
| 4,077,565 | 3/1978 | Nibby, Jr. et al. | 371/38 |
| 4,112,502 | 9/1978 | Scheuneman | 364/900 |
| 4,393,502 | 7/1983 | Tanaka et al. | 371/40 |
| 4,456,996 | 6/1984 | Haas et al. | 371/37 |
| 4,712,216 | 12/1987 | Glaise | 371/38 |
| 4,745,604 | 5/1988 | Patel et al. | 371/38 |

Primary Examiner—Charles E. Atkinson
Attorney, Agent, or Firm—Fliesler, Dubb, Meyer & Lovejoy

[57] ABSTRACT

The present invention provides an apparatus for reporting errors in data stored in a memory apparatus of a data processor, comprising: first means for storing multiple digital first signals; second means for storing said multiple digital first signals and adapted for storing at least one digital second signal; third means for transmitting said multiple digital first signals substantially from said first means to said second means; fourth means for providing said at least one digital second signal, in the course of the transmitting of said first signals by said third means, in response to an occurrence of one or more errors in one or more of said multiple digital first signals; fifth means for transmitting said multiple digital first signals substantially from said second means to said first means; and sixth means adapted for receiving said at least one digital second signal in the course of the transmitting of said multiple digital first signals by said fifth means and for providing at least one third signal in response to an occurrence of said at least one digital second signal. ECC codes are generated and applied over a plurality of distinct checking blocks in each flow of data in order to minimize delays in the move-in data path, and bypass data paths are provided such that a flow may bypass all error checking and correcting circuitry and cacheing apparatus between the main storage array and the CPU.

13 Claims, 5 Drawing Sheets

FIG.-2

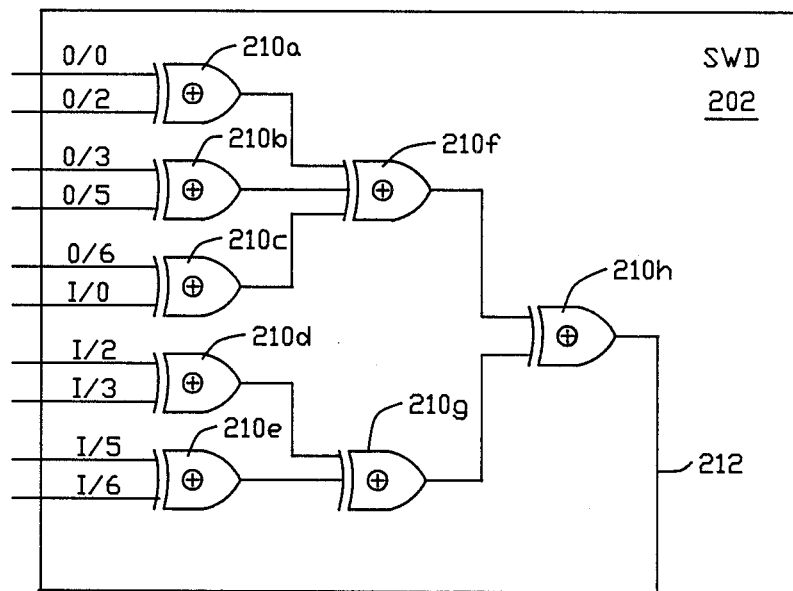
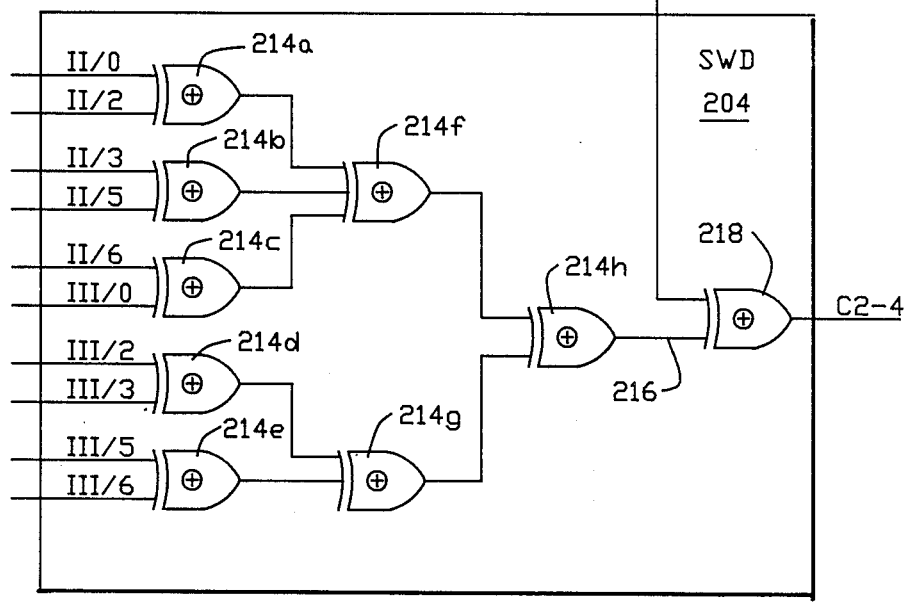
FIG.-3

ERROR DETECTION AND CORRECTION SCHEME FOR MAIN STORAGE UNIT

CROSS-REFERENCES TO RELATED APPLICATIONS

The present application is a continuation-in-part of U.S. patent application Ser. No. 920,522 filed Oct. 17, 1986, now U.S. Pat. No. 4,761,783 issued 8-2-88.

This application is related to U.S. patent applications:
(1) CACHE MOVE-IN BYPASS, Ser. No. 041,046 filed Apr. 20, 1987, inventors: J. Chen et. al.,
(2) Ser. No. 920,803, filed Oct. 17, 1986, now U.S. Pat. No. 4,722,046 issued 1-26-88, entitled CACHE STORAGE PRIORITY,
(3) Ser. No. 908,623, filed Sept. 18, 1986, entitled EXECUTION SUB-UNIT SYNCHRONIZATION,
(4) Ser. No. 900,640, filed Aug. 27, 1986, entitled CACHE STORAGE QUEUE,
(5) Ser. No. 527,673, filed Aug. 30, 1983, now U.S. Pat. No. 4,742,454 issued 5-3-88, entitled APPARATUS FOR BUFFER CONTROL BYPASS.

All the above applications are currently owned, and were owned at the time of invention, by the same assignee as the present application. Further, each of these applications is incorporated by reference as if fully set forth in this application.

BACKGROUND OF THE INVENTION

1. Field of the Invention.

The invention relates to apparatus for detecting and correcting errors in data stored in a data processor.

2. Description of the Related Art.

A typical data processor includes a central processing unit (CPU) which executes instructions which either process data or cause the transfer of data among different functional units of the data processor. A main storage unit having a relatively large storage capacity ordinarily stores programs and data used by the programs. Data to be processed by the central processing unit ordinarily is transferred from the main storage unit to an intermediate storage unit, having cache memory, before processing actually begins. The cache memory interfaces directly with the central processing unit. Usually, the cache has a relatively low storage capacity but operates at relatively high speed to provide the data to the central processing unit for use during execution of a corresponding program.

Frequently, a variety of processes share the use of the CPU. Moreover, often the CPU interrupts the execution of a program corresponding to a first active process in order to execute a program corresponding to a second process which takes precedence over the first active process. In order to execute the program corresponding to the second process, however, it ordinarily is necessary for the data corresponding to the second process to be moved into the cache. Consequently, often it is necessary to move out the data corresponding to the first process from the cache in order to make room for the data corresponding to the second process. Typically, the data corresponding to the first process is moved into the main storage unit for storage during execution by the CPU of the program corresponding to the second process.

Subsequently, after the CPU has executed the program corresponding to the second process, the data corresponding to the first process, once again can be moved into the cache. Moreover, a typical data processor ordinarily includes a data storage control system which controls the transfer of data between the cache and the main storage unit such that data associated with programs actively being executed by the central processing unit can be moved into the cache, and data associated with processes to be executed later by the CPU can be moved out of the cache and into the main storage unit.

One problem associated with the storage of data by a data processor in general, and associated with the transfer of data between the cache and the main storage unit in particular, stems from the occurrence of errors in the stored data. Errors are manifested, for example, as unwanted changes in the binary state of bits within a byte or line of data. Errors can occur in a variety of locations such as in the cache, in the main storage unit or in the course of transferring the data between the cache and the main storage unit. Since data errors detrimentally affect the performance of the data processor, the data storage control system ordinarily includes components directed to detecting and reporting such errors.

For example, in the past, error checking and correcting (ECC) codes frequently were used to detect errors occurring in data stored in the cache and to correct certain of the errors. More specifically, an ECC code was generated by apparatus in the intermediate storage unit each time data was moved into the cache. The ECC code, for example, could comprise a set of single bit binary signals, each of which represented a parity bit covering a particular set of data bits, each respective data bit being covered by more than one ECC code bit. The ECC code was stored in the cache in conjunction with the corresponding data. Subsequently, when the data was moved out of the cache, apparatus in the intermediate storage unit used the ECC code to detect the occurrence of errors in the data and to correct certain of those errors.

Since the intermediate storage unit and the main storage unit often were physically spaced apart within the data processor by a relatively significant distance, errors often could occur in the course of the transfer. Consequently, the data typically was covered by parity during the transfer in order to detect occurrences of errors in the course of the transfer.

For example, commonly assigned patent application Ser. No. 06/527,672 filed Aug. 30, 1983, now U.S. Pat. No. 4,625,273, issued 11-25-86, entitled, APPARATUS FOR FAST DATA STORAGE WITH DEFERRED ERROR REPORTING and commonly assigned continuation application Ser. No. 790,269 filed Oct. 22, 1985, now abandoned, entitled, APPARATUS FOR STORING DATA WITH DEFERRED UNCORRECTABLE ERROR REPORTING which is a continuation of commonly assigned application Ser. No. 527,621, filed Aug. 29, 1983, now U.S. Pat. No. 4,546,329, issued 10-8-85, generally pertain to the reporting of errors present or occurring in the course of the move-out of data signals from a cache to a main storage unit.

The move-in process for retrieving a requested operand from a main storage unit is a comparatively time-consuming operation in a computer. In high speed pipelined machines, the instruction and operand processing unit pipeline may interlock while awaiting the supply of a requested operand. If the operand resides in a line missing from the cache, the lengthy move-in process will result in an undesirably long interlock of the instruction and processing unit pipeline. Thus it is desirable to reduce the time required, called the cache miss penalty, for supplying a requested operand to the instruction and operand processing complex from a line missing state.

One example of a prior art solution to the problem of reducing a wait for a requested operand in a line missing state is described in U.S. patent application Ser. No. 527,673 filed Aug. 30, 1983, now U.S. Pat. No. 4,742,454 issued 5-3-88, entitled APPARATUS FOR BUFFER CONTROL BYPASS. In the APPARATUS FOR BUFFER CONTROL BYPASS application, the control of the buffer is modified in the line missing state so that a quicker transfer of a requested operand can occur. This buffer control bypass occurs because data in the cache is stored in units known as lines, while operands requested by the instruction and operand processing unit are typically less than an entire line of data. Further, when a line of data is being moved into the cache, it comes in a plurality of segments or flows, such as quarterlines. It was found in the buffer control bypass system, that a line being moved in can be aligned to provide the requested operand from the move-in register to the cache first. Buffer control can then be bypassed to allow a read of the requested operand from the data location in the cache before the balance of the line is written to the cache. This was found to result in a significant improvement in system performance by reducing the waits caused by a line missing state.

Another example of a prior art approach to reducing the overhead in time of a line missing state has been to provide a data path in the intermediate storage unit directly from the output of error checking and correcting logic in such intermediate storage unit, through a bypass data register for holding the requested operand latched in parallel with the move-in register. In addition, a complicated bypass match logic was required to indicate when the data in the bypass data register was the requested operand. By moving the bypass path back effectively to the move-in register in the intermediate storage unit prior to the cache, a significant savings was accomplished over the control bypass scheme; however, a significant penalty in logic complexity was paid.

Even when the delay in the move-in data path in the intermediate storage unit is minimized, the delay in reading data from the main storage array and providing it to the intermediate storage unit can still slow the operation of the data processing system. The error checking and correcting logic in the MSU, as distinguished from the error checking and correcting logic in the intermediate storage unit, is a significant component of this delay.

Broadly stated, ECC codes provide a method of adding redundancy to data. Techniques have been devised which generate a minimal number of ECC bits to be stored in association with a given block of data, called a checking block, which bits may be subsequently analyzed to determine whether an error has occurred, and if so, how it can be corrected. One tradeoff available to the designer with these techniques is that the greater the number of ECC bits used with a given checking block size, the greater the number of errors within a checking block which may be detected and/or corrected. For example, a 5-bit ECC may permit detection of double-bit errors and correction of single-bit errors, but a larger ECC, possibly made up of seven bits, may permit detection of triple-bit errors and correction of double bit errors.

Typically, the entire width of a data path or storage array is used as the checking block. The mathematics of ECC codes teaches that the ratio of ECC bits to data bits decreases as the size of the checking block over which the ECC code is generated increases, for a fixed n-bit error detection and m-bit error correction capability. As data paths and storage arrays for high speed computers have become wider, therefore, the trend has been to generate and check ECC codes over these larger blocks. Designers have taken advantage of the savings in the total number of ECC bits either directly, by minimizing the total number of bits (data plus ECC) which need to be stored in a storage array or sent along a data path, or indirectly, by using the saved bits to enlarge the ECC code and thereby improve the error detection and/or correction capability as described above. Both alternatives, however, suffer from the fact that additional levels of logic are required as the size of the checking block increases. Additional levels of logic slow the process of detecting and correcting errors and add undesirable delay in the move-in data path.

This problem is particularly acute in a machine such as the Amdahl 5890 line of computers, in which a line of data is provided from the main store in four sequential flows of 16 bytes (one quarterline) per flow. Error checking and correcting based on a single ECC code over all 16 bytes in a flow would be extremely slow, requiring more time than is available in one clock cycle to complete.

The problem is additionally complicated by the fact that the main storage unit for large mainframe computers is often too large to fit on a single printed circuit backplane. The storage unit may therefore be divided into a plurality, for example four sub-units, each with its own backplane and each providing a portion of any given flow of data. In order to generate and check ECC codes over an entire flow of data, therefore, long cables may be required to cross-couple the sub-units to pass partial XOR results back and forth. These long cables increase the time required to generate and check ECC codes significantly.

SUMMARY OF THE INVENTION

It is therefore an object of the present invention to provide apparatus for performing high-speed error detection and correction in a main storage unit over a very wide data path.

It is another object of the present invention to provide apparatus which minimizes the time required to retrieve data from a main storage array and provide it to a requestor.

These objects and others are achieved according to one aspect of the invention by providing error detection logic in the MSU for detecting errors in a flow of data being provided to the requestor, which error detection logic requires no more than one clock cycle to generate signals indicating whether an error was detected. The uncorrected flow of data, however, is provided to the requestor as soon as it is available from the main storage array. The requestor may then begin processing with the uncorrected data at least one cycle before it learns whether the flow contained an error, and restart with corrected data only in the rare instance when the flow did contain a correctable error. The delays inherent in error detection and correction of data being provided by the main storage unit are therefore bypassed in the vast majority of cases where the data is error-free.

With respect to another aspect of the invention, it is still desirable to minimize the time required to detect and correct errors in the primary move-in data path even when a move-in bypass path is provided as above. This is because if a correctable error has occurred, the instruction and operand processing unit will have to abort any processing it has already begun using the bypass data and recycle to perform the same processing using the corrected data arriving on the primary move-in data path. (Detection of errors that are uncorrectable are usually not time sensitive, since such errors usually trigger suspension of normal processing and commencement of lengthy diagnostic procedures.) The greater the number of processing unit clock cycles which elapse between arrival of the bypass data and notification of whether such bypass data contained a correctable error, the greater the time penalty incurred if recycling becomes necessary. Also, the farther the processing unit has gone in processing the bypass data, the more difficult it will be to recycle the different parts of the processing unit to their unaffected states. It is therefore still desirable to minimize the insertion delay of the error detection and correcting circuitry even when a bypass path is present. Preferably, the corrected data should be available to the processing unit by the next processing unit clock cycle following the clock cycle in which the bypass data was used.

Thus, according to another aspect of the invention, the data path is divided into a plurality of sub-blocks, each sub-block constituting an independent checking block. A separate ECC code is generated for each checking block. Each such ECC code is stored in association with the checking block to which it pertains, and is used to detect and correct errors in only that checking block on readout. For example, if the data path has a width of 16 bytes (one quarterline), then a separate, independent ECC code could be generated for each of the four four-byte sub-blocks of data in the data path.

Not only does this aspect of the invention minimize the time required to perform error detection and correction by limiting the size of the data block to which ECC codes pertain, but it also provides increased detection and correction capability. If each ECC code is sufficient to perform single-bit error correction and double-bit error detection, for example, then apparatus constructed according to the invention would be capable of detecting and correcting proportionately higher numbers of errors per flow. In the above example of four four-byte checking blocks per flow, apparatus according to the invention would permit correction of up to four errors per flow and detection of up to eight errors per flow, provided only that each four-byte checking block does not have more than two errors. Prior art techniques would have achieved such improved error detection and correction capability by enlarging the single ECC code covering the entire data path width, with the consequent disadvantages described above.

In computers where the data is stored in physically separate storage sub-units as described above, the data sub-blocks for which ECC codes are generated should be co-extensive with the data portions stored in the storage sub-units, in order to avoid extensive cross-coupling of the ECC XOR trees.

These and other features and advantages of the present invention will become more apparent from the following detailed description of an exemplary embodiment thereof, as illustrated in the accompanying drawings.

BRIEF DESCRIPTION OF THE DRAWINGS

The purpose and advantages of the present invention will be apparent to those skilled in the art from the following detailed description in conjunction with the appended drawings in which:

FIG. 2 illustrates an array which illustrates a relationship between certain digitally encoded signals shown in FIG. 1;

FIG. 3 shows an XOR tree which may be used to generate a bit of an ECC code;

DETAILED DESCRIPTION OF THE PREFERRED EMBODIMENTS

The following description is presented to enable any person skilled in the art to make and use the invention, and is provided in the context of a particular application and its requirements. Various modifications to the preferred embodiment will be readily apparent to those skilled n the art, and the generic principles defined herein may be applied to other embodiments and applications without departing from the spirit and scope of the invention. Thus, the present invention is not intended to be limited to the embodiment shown, but is to be accorded the widest scope consistent with the principles and features disclosed herein.

The embodiment described herein may be used with apparatus described in the aforementioned U.S. patent application entitled CACHE MOVE-IN BYPASS, by J. Chen, et. al., filed Apr. 20, 1987. That application describes apparatus for bypassing requested operands directly from the main storage unit (MSU), i.e., prior to the error checking and correcting logic in the intermediate storage means. The apparatus comprises supply means for supplying the data from the main storage unit to the intermediate storage unit. In addition, an error detecting means is included coupled to the supply means for detecting errors in the data being supplied from the main storage unit. A move-in register is coupled to the error detecting means for storing the retrieved data pending storage in the intermediate storage unit. Storage means in the intermediate storage unit is coupled to the move-in register for storing data retrieved from the main storage unit for supply to the instruction and operand processing unit in response to requests. A primary data path is coupled to the storage means in the intermediate storage unit and the instruction and operand processing unit for transferring requested operands to the instruction and operand processing unit. A bypass data path is connected between the supply means prior to the error detecting means and the instruction and operand processing unit for transferring requested operands to the instruction and operand processing unit directly from the supply means. Finally, control means are coupled to receive requests for operands and to the instruction and operand processing unit to signal the instruction and operand processing unit to receive the requested operands from the bypass data path when the data in the supply means includes a requested operand.

Figure 1:
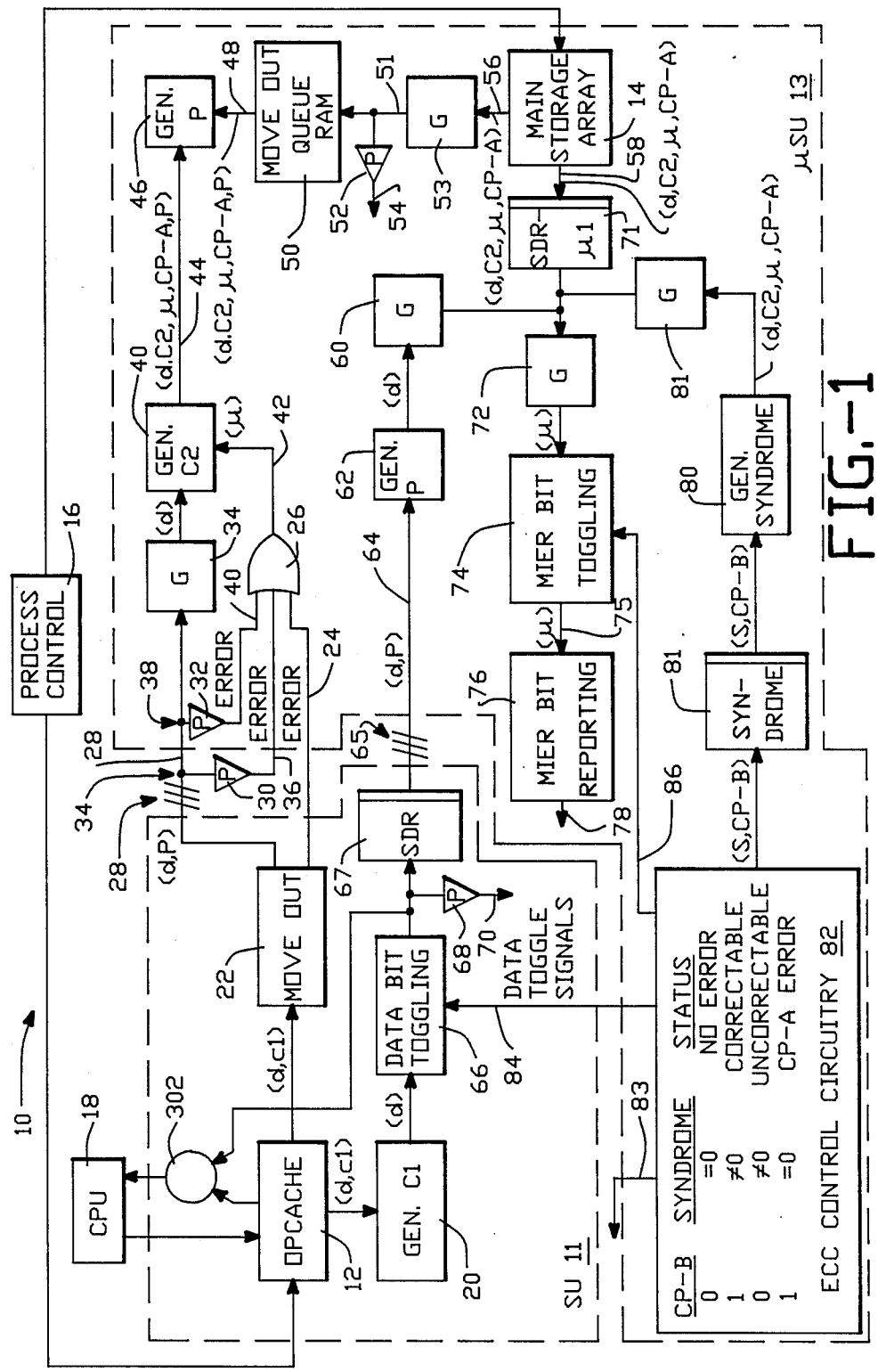
FIG. 1 is a data flow diagram illustrating the flow of digitally encoded signals within a data storage unit incorporating a presently preferred embodiment of the invention.

FIG. 1 provides an exemplary data flow diagram which illustrates the flow of digitally encoded signals, in accordance with the present invention, within a data storage unit 10 of a data processor. The data storage unit 10 includes an intermediate storage unit 11 ("SU"), having an operand cache memory unit (opcache) 12. The data storage unit 10 further includes a main storage unit 13 ("MSU"), having a main storage array 14. The op-cache 12 is coupled to the main storage array 14 so that data (represented by the letter d) stored in the op-cache 12 can be transferred to the main storage array 14 for storage. Moreover, the coupling is accomplished such that the data (d), after storage in the main storage array 14, can be transferred back to the op-cache 12. The transfer of data (d) between the op-cache 12 and the main storage array 14 is controlled by process control circuitry 16 which forms no part of the present invention and which need not be described in detail herein.

The op-cache 12 typically serves as a temporary storage location for operand data (d) communicated with a central processing unit (CPU) 18 of the data processor. The op-cache 12 ordinarily operates as a high speed memory interfacing directly with the CPU 18. Usually, the amount of memory space available in the op-cache 12 is substantially less than that available in the main storage array 14. Thus, the op-cache 12 can store only a relatively limited amount of data (d).

At times, a first process actively using the CPU 18 is interrupted so that a second process, which takes precedence over the first process, can use the CPU 18. When such an interruption occurs, it is necessary to move data (d) corresponding to the first process out of the op-cache 12 and to transfer that data (d) to the main storage array 14 in order to make room in the op-cache 12 for new data corresponding the precedence-taking second process. The process control circuitry 16 controls the transfer of data (d) between the op-cache 12 and the main storage array 14.

The data (d) is stored in conjuction with first error checking and correcting (ECC) code comprising a first set of check bits (Cl). More particularly, before the data (d) is provided to the op-cache 12, it is provided to first check bit generating circuitry 20 which generates the first set of ECC code check bits (Cl). The data (d) is stored in the op-cache 12, and the first set of check bits (C1) are stored in conjuction with the data (d).

Each check bit in the first set of ECC code check bits (C1) acts as a parity bit over a group of data bits stored in the op-cache 12, and each data bit is covered by a unique pattern of check bits. Upon transfer of the data (d) from the op-cache 12 to the main storage array 14, the first set of check bits (C1) is used to detect errors in the data (d) and to correct certain of those errors.

The manner in which the set of first check bits (C1) is generated and the manner in which the first set of check bits (C1) is used to detect errors and to correct certain of the errors in the data (d) forms no part of the present invention and will be understood by those skilled in the art. Moreover, the manner of generating and using the first set of check bits (C1) is similar to the manner of generating and using a second set of check bits (C2) which is discussed and explained more fully below in connection with the storage of the data signals (d) in the main storage array 14.

More specifically, in the course of the transfer of the data signals (d) from the op-cache 12 to the main storage array 14, the op-cache 12 provides the data signals and the first set of check bits (d, C1) to first move-out circuitry 22 which uses the first set of check bits (C1) to detect the occurrence of errors in the data signals (d), to correct single bit errors in the data signals and to report (uncorrectable) multiple bit errors in the data signals on line 24 to OR gate 26. Additionally, the first move-out circuitry 22 applies parity signals (p) to the data signals (d) provided by the op-cache 12. It then provides the data signals with parity (d, p) on cable lines 28.

The cable lines 28 extend substantially between the op-cache 12 and the main storage unit 13. The op-cache 12 and the main storage array 14 are spatially separated by a significant distance. Thus, the length of the cable lines 28 is relatively long. Unfortunately, cable lines often can be relatively low reliability components which can be susceptible to occurrences of errors in data signals conducted by the cable lines. Consequently, it is necessary to test for occurrences of errors occurring in the course of data signal (d) transmission along the cable lines 28. Thus, parity checking circuits 30 and 32 are coupled to logic paths 29 coupled to the cable lines 28 which conduct the data signals (d) from the cable lines 28 to the main storage unit 13. The parity checking circuits 30 and 32 check for occurrences of parity errors in the data signals (d). It will be appreciated that the provision of multiple temporally spaced parity checking circuit 30 and 32 serves to distinguish occurrences of errors along the logic paths 29 from occurrences of errors along the cable lines 29. This distinguishing facilitates diagnostic procedures, which form no part of the present invention, directed to diagnosing the source and cause of such parity errors.

In the event that parity checking circuit 30 detects a parity error in data signals (d) at a first location generally indicated by arrow 34 along the cable lines 28, then it provides an error signal on line 36 to the OR gate 26. Similarly, in the event that parity checking circuit 32 detects a parity error in data signals (d) at a second location generally indicated by arrow 38 then it provides an error signal on line 40 to the OR gate 26. Although only two parity checking circuits, 30 and 32, are shown in the illustrative drawings of FIG. 1, it will be appreciated that more parity checking circuits can be provided if desired.

Data signals (d) on the logic path 28, are provided via gate 39 together with a move-in error (MIER) bit (M) provided by the OR gate 26 on line 42, to second check bit generating circuitry 40. The gate 39 removes the parity bits (p) from the data signals (d) and provides the data signals to the generating circuitry 40. The MIER bit (M) provided on line 42 represents a record of occurrences of uncorrectable errors in the data signals (d) while stored in the op-cache 12 and in the course of their transfer on cable lines and logic path 28. Since the MIER bit is generated in the course of transfer of particular data signals (d), errors recorded by the MIER bit are identified with those particular data signals (d) which generated the bit. The second check bit generating circuitry 40, in turn, provides on lines 44 the data signals (d), the MIER bit (M) a second set of ECC code check bits (C2), and new parity signals (p) (covering the data signals the second set of check bits and the MIER bit (d, C2, M)).

An understanding of the method and apparatus of the present invention will be facilitated by a further explanation of the manner in which data plus parity (d, p) is conducted on cable lines 28 between the op-cache 12 and the main storage array 14. More particularly, data signals (d) are stored in the op-cache 12 in 64-byte wide lines. Each line of data signals is transferred to the main storage array 14 in four flows, each flow comprising 16-bytes of data. As previously mentioned, each 16-byte flow includes four 4-byte checking blocks, and each byte includes eight bits of data. Each individual byte of each 4-byte checking block is covered by one parity bit in the course of its transfer on the cable lines 28. Thus, there are four parity bits per 4-byte checking block. The cable lines 28, illustrated in FIG. 1, therefore, represent a plurality of cables suitable for conducting in parallel sixteen eight bit bytes of data plus one parity bit per byte. The four flows of 16-bytes are transferred in serial between the op-cache 12 and the main storage array 14.

For each flow of data signals (d) transferred on the cable lines 28, a respective MIER bit (M) is generated. A copy of the MIER bit then is generated for each of the four checking blocks in each flow. Although the drawings of FIG. 1 illustrate circuitry associated with only one respective checking block, it will be appreciated that similar circuitry which is not shown is associated with the three respective remaining checking blocks of the flow.

Moreover, it will be understood that the logical state of the MIER bit provided on line 42 will depend upon whether error signals are provided on either of lines 24, 36 or 40. If an error signal is provided on any one or more of those three lines then the logical state of the MIER bit will be a logical one indicating the occurrence of one or more errors in the respective checking block; conversely, if no error signals are provided on any of lines 24, 36 or 40 then the logical state of the MIER bit will be a logical zero indicating no error occurrences.

Figure 2:
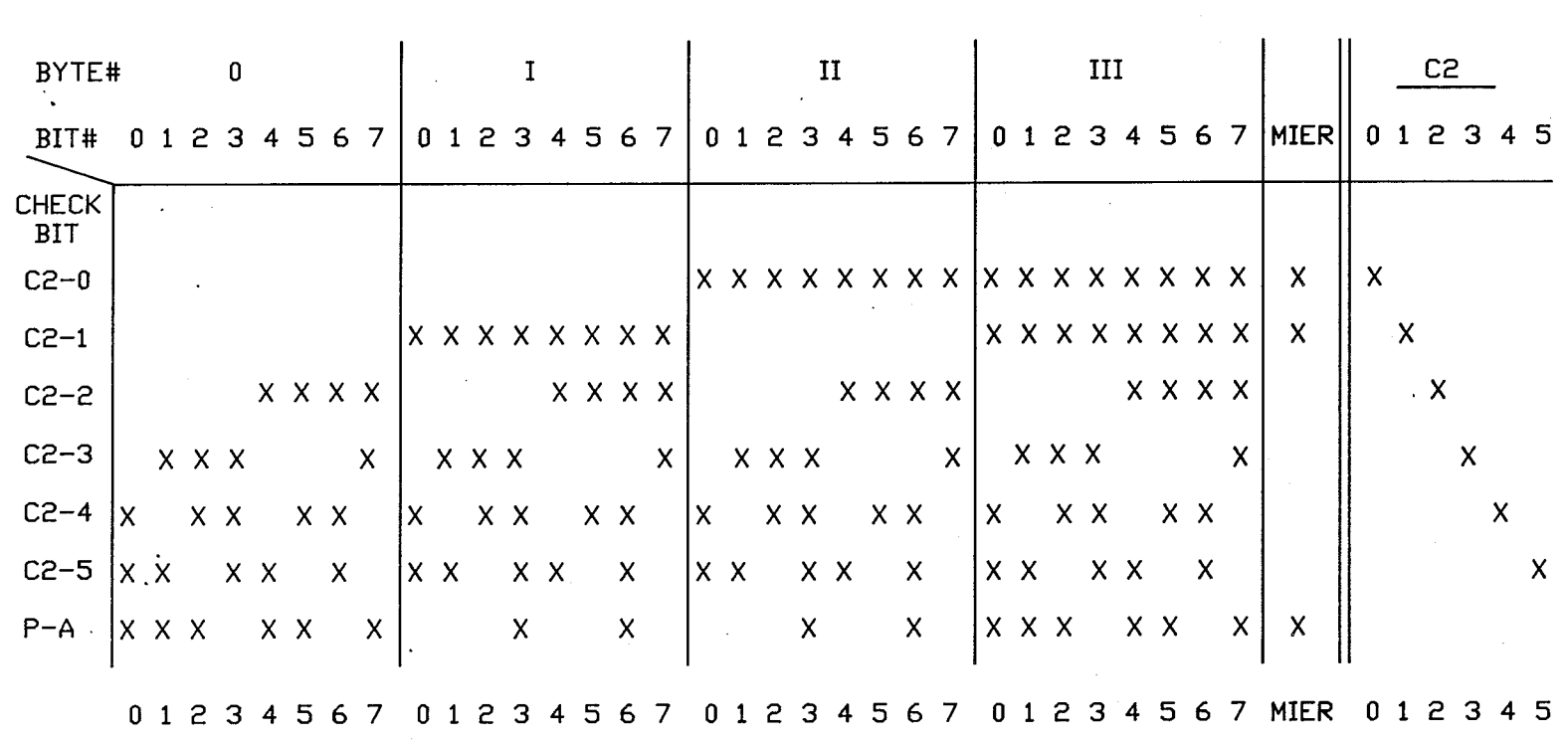

The exemplary array of FIG. 2 is illustrative of the operation of the second check bit generating circuitry 40 of FIG. 1. The array illustrates one respective representative 4-byte checking block. The respective eight bits of each respective byte of data signals in the representative checking block are divided in the array into four eight bit bytes labelled 0, I, II and III. Individual bits within each byte are labelled 0 through 7. A bit labelled MIER represents the move-in error bit (M) for the checking block. The array illustrates the relationship between the data signals (d) and the MIER bit (M) to the second set of ECC code check bit signals (C2).

More specifically, the illustrative array of FIG. 2 is representative of a network of exclusive OR logic gates coupled to receive the data signals (d) and an MIER bit (M) as inputs and to provide the respective second set of ECC code check bit signals (C2) as outputs. The manner of constructing the network and its operation will be understood by those skilled in the art and need not be described in detail herein. The arrangement of the various gates of the network will be discussed below.

Referring once again to FIG. 1 and to the bottom row of the array of FIG. 2, it will be appreciated that, in addition to providing on lines 44 signals (d, C2, M), the second check bit generating circuitry 40 also provides a first check parity bit CP-A as will be explained below. Furthermore, parity signals (p) also are provided on lines 44 in order to cover the data signals (d).

In operation, the second check bit generating circuitry 40 of FIG. 1 generates each check bit in the second set (C2) from a subset of the data signals (d) in the respective checking block. Referring to the array of FIG. 2, reading across the top of the array, each respective data bit corresponds to a (vertical) column of "X's" in the array directly beneath the respective data bit. Similarly, the MIER bit also corresponds to a column of "X's" in the array directly beneath the MIER bit. Conversely reading down the left side of the array, each respective check bit in the second set (C2) corresponds to a respective (horizontal) row of "X's" in the array directly to the right of the respective check bit.

Each respective occurrence in the array of an "X" at a respective intersection of a column corresponding to a respective data bit and a row corresponding to a respective check bit indicates that the respective data bit is used to generate the respective check bit. Similarly, where an "X" corresponding to the MIER bit appears in the respective row corresponding to the respective check bit, the MIER bit is used to generate the respective check bit. For example, data bits 0–7 of bytes I and III and the MIER bit are used to generate check bit C2-1. Furthermore, for example, check bit C2-3 is generated using respective bits 1, 2, 3 and 7 of bytes 0, I, II and III.

Each data bit and the MIER bit contribute to the generation of at least two check bits of the second set. For example, the MIER bit (M) contributes to the generation of both check bits C2-0 and C2-1. Thus, each check bit in the second set of check bits acts as a parity bit over a group of bits (either solely data bits or data bits plus the MIER bit) transferred from the op-cache 12, and each such bit is covered by a unique pattern of check bits. As will be understood from the discussion below, the second set of check bits (C2) are used to detect occurrences of errors in the data signals or the MIER bit (M) and to correct single bit errors.

Reading down the left side of the array once again, the bottom row of the array corresponds to the first check parity bit (CP-A). The data bits corresponding to "X's" in the bottom row of the array and the MIER bit are used to generate the first check parity bit. The first check parity bit (CP-A) is used to distinguish single bit errors from multiple bit errors.

The second set of ECC code check bit signals (C2) together with the first check parity bit (CP-A) can be used as described below to detect single or multiple bit errors in the data signals and the MIER bit (d, M) occurring in the main storage array 14 or in a move-out queue RAM 50 described below. These signals (C2, CP-A) also can be used to correct error occurrences involving only single bits of data or only the MIER bit. Thus, the integrity of the MIER bit (M) is protected using the second set of ECC code check bits (C2) and the first check parity bit (CP-A).

The description which follows explains the transferring, storage, checking, correcting and reporting associated with only one representative checking block within a respective line of data signals (d). Similar procedures apply and similar circuitry is used for each other checking block of a respective line of data signals. Therefore, although procedures and circuitry are described for only the 4-bytes of one representative checking block, it will be understood that similar procedures and circuitry are used for each 4-byte checking block of each 64-byte line of data signals (d) transferred between the op-cache 12 to the main storage array 14.

Referring now to FIG. 1, signals (d, C2, M, CP-A, p) are provided on lines 44 to parity applying circuitry 46 which applies parity signals to cover signals (C2, M, CP-A). More particularly, one parity bit is applied to cover check bits $C_0$, $C_2$, $C_4$, and M, and another parity bit is applied to cover check bits $C_1$, $C_3$, $C_5$ and bit CP-A.

Signals (d, C2, M, and CP-A, p) then are provided on lines 48 to the move-out queue RAM 50. The move-out queue RAM 50 is described in detail in commonly assigned patent application Ser. No. 909,500, filed on Sept. 19, 1986, entitled, MOVE-OUT QUEUE BUFFER which is incorporated herein by this reference. Since the transfer of data from the op-cache 12 to the main storage array 14 is a lower priority operation with respect to the transfer of data from the main storage array 14 to the op-cache 12, the move-out queue RAM 50 is included in the data storage unit 10 so as to store several cycles of the signals (d, C2, M, CP-A, p) until they can be provided as described below to the main storage array 14.

Since the move-out queue RAM 50 includes ample storage capacity to store signals (d, C2, M, CP-A, p) for a significant number of cycles, there is a possibility that errors will occur in the signals during their storage by the move-out queue RAM 50. Therefore, parity checking circuitry 52 is provided for checking the parity of the signals (d, C2, M, CP-A) provided by the move-out queue RAM 50 on lines 51 for provision to the main storage array 14 and for reporting parity errors on line 54 to diagnostic circuitry which is not shown and which forms no part of the present invention. Gate 53 provides the remaining signals (d, C2, M, CP-A) on lines 56 to the main storage array 14. Signals (d, C2, M, CP-A) are stored in the main storage array 14 until, for example, the process control circuitry 16 causes them to be provided on lines 58 for transfer back to the op-cache 12 as described below.

At this point it is useful to note that, at the time that the data signals (d) are moved out of the op-cache 12 and are moved into the main storage array 14, they generally are not identified with a particular process. Consequently, at that time the MIER bit (M) although it is identified with the data signals of a particular checking block, is not identified with a particular process either.

Subsequently, however, when the process control circuitry 16 causes the data signals (d) of the checking block to be moved out of the main storage array 14 for transfer to the op-cache 12, the respective data signals (d) of the checking block are identified with a particular process. This is because the process control circuitry 16 ordinarily causes data to be transferred from the main storage array 14 to the op-cache 12 only when a particular process requires its own data. Consequently, at that subsequent time the respective MIER bit (M) stored in the main storage unit 16 in conjunction with respective data signals of the checking block also is identified with the same known process.

Thus, when the data signals are provided on line 58 for transfer to the op-cache 12, the existence of errors in the respective data signals which occurred during storage in the op-cache 12 or in the course of the transfer from the op-cache 12 to the main storage array 14 can be detected by checking the logical state of the MIER bit, and the data signals (d) containing those errors can be associated with a particular process. The ability to both detect such errors and to associate the particular data signals containing the errors with a particular process, as described below, advantageously can be used to simplify diagnostic procedures by permitting a process using erroneous data signals to be more quickly identified.

The second set of ECC code check bits (C2) and the first check parity bit (CP-A) can be used to detect errors in signals (d, C2, M, CP-A) occurring in the move-out queue RAM 50 or in the main storage array 14. Errors, may occur, for example, due to alpha particle collisions which cause one or more bits within signals (d, C2, M, CP-A) to experience an unwanted change from one logical state to another logical state.

When the control process circuitry 16 causes the main storage array 14 to provide signals (d, C2, M, CP-A) on lines 58, the signals are first latched in an SDRM1 latch point 71. The data signals (d) are then provided by gate 60 to parity applying circuitry 62 which applies parity to the data signals (d). The data signals plus parity (d, p) are provided on cable lines 64 to an SDR latch point 67, where they are latched one clock cycle after the flow was latched in SDRM1 latch point 71. The output of SDR latch point 67 is provided to data bit toggling circuitry 66 which is used for toggling erroneous data bit signals. Circuitry described below identifies correctable errors in the logical state of respective data bits, if there are any such correctable errors, and provides on lines 84 signals which cause the data bit toggling circuitry 66 to toggle a correctable erroneous data bit to change its logical state from an erroneous state to a correct state.

Parity checking circuitry 68 is coupled to logic paths 64 between the main storage array 14 and cable lines 65 which conduct the data signals (d) from the main storage array 14 to the op-cache 12 in the course of the move-in of the data signals (d) to the op-cache 12. The parity checking circuitry 68 checks for occurrences of parity errors in the data signals (d) in the course of their transmission on the cables 65. Parity errors in the data signals (d) occurring in the course of their transfer are reported on line 70 to diagnostic circuitry which is not shown and which forms no part of the present invention. Although only one parity checking circuit 68 is shown in FIG. 1, it will be appreciated that additional parity checking circuits can be included to check for parity errors occurring at different temporally spaced locations along the logic paths 64 between the main storage array 14 and the op-cache 12.

Gate 72 provides the MIER bit (M) to MIER bit toggling circuitry 74 which is used for toggling erroneous MIER bits. Circuitry described below identifies correctable errors in the logical state of the MIER bit, if there are any such correctable errors, and provides on line 86 signals which cause the MIER bit toggling circuitry 74 to toggle a correctable erroneous MIER bit to change its logical state from an erroneous state to a correct state.

Gate 81 provides signals (d, C2, M, CP-A) from SDRM1 latch point 71 to syndrome generating circuitry 80. The syndrome generating circuitry 80 generates a syndrome (S) comprising a set of six syndrome bits. The syndrome generating circuitry 80 includes an exclusive OR logic gate network which, like the second check bit generating circuitry 40 can be illustrated and explained using the exemplary array of FIG. 2.

More particularly, each respective syndrome bit corresponds to a respective row of the array. For each respective row of the array, respective data bits corresponding to respective columns for which corresponding "X's" appear in the respective row, are used to generate a respective syndrome bit which corresponds to that respective row. The same is true for the MIER bit; where an "X" appears in a respective row under the MIER bit, the MIER bit also is used to generate a respective syndrome bit which corresponds to that respective row. Moreover, reading down the left side of the array, the respective check bit corresponding to the respective row also is used to generate the syndrome bit which corresponds to that respective row.

For example, a first syndrome bit corresponds to the top row of the array. Bits 0–7 of bytes number II and III and the MIER bit are provided as input signals to an exclusive OR logic gate network together with check bit C2-0 in order to generate the first syndrome bit. Furthermore, for example, a sixth syndrome bit corresponding to the sixth row of the array, is generated by providing as input signals to an exclusive OR logic gate network, bits 0, 1, 3, 4 and 6 of bytes 0, I, II and III of the checking block together with check bit C2-5. The manner in which an exclusive OR logic gate network is constructed and used to generate the syndrome (S) will be understood by those skilled in the art and need not be described in detail herein.

The syndrome (S) permits the detection of errors occurring in the move-out queue RAM 50 or in the main storage array 14. It also permits the correction of such errors where an error has occurred in only a single data bit or only in the MIER bit. In the preferred embodiment, if the syndrome is all zeros (000000) then this means that no errors in the data signals (d) or in the MIER bit (M) have occurred in the move-out queue RAM 50 or in the main storage array 14. If the syndrome is 001010, however, for example, then this means that an error has occurred in bit 5 of byte 0 of the checking block. This can be read from the array be noting that there are "X's" in rows two and four in the column directly beneath bit five of the byte 0. If, on the other hand, for example, the syndrome (S) is 000111 then this means that there is an error in bit 3 of byte 0. Moreover, if the syndrome is 001000 then this means that there is an error in check bit C2-2. If the syndrome is 110000, for example, then this means that there is an error in the MIER bit. The syndrome (S) advantageously can be used to map occurrences in the move-out queue RAM 50 or in the main storage array 14 of errors in the data signals (d) or the MIER bit (M) when there are single bit errors.

The CP-A bit is used in conjunction with the syndrome (S) to determine whether error occurrences involve only a single bit or multiple bits. More specifically, the syndrome generating circuitry 80 generates a second check parity bit (CP-B) by providing all of the data signals (d) and the MIER bit (M) and the second set of check bit, signals (C2) together with the first check parity bit (CP-A) as inputs to an exclusive OR logic gate network which can be understood by reference to the array of FIG. 2, in a manner which will be understood by those skilled in the art. The CP-B bit is used as described below to determine whether there are single bit or multiple bit errors in signals (d, M, C2). The syndrome (S) and the CP-B bit are latched in a syndrome latch point 81 on the same clock cycle that the data (d) to which they correspond is latched into SDR latch point 67.

More specifically, the syndrome (S) and the second check parity bit (CP-B) are provided to error checking and correcting (ECC) control circuitry 82. In the preferred embodiment, the ECC control circuitry 82 reports occurrences of multiple (uncorrectable) errors on line 83 to diagnostic circuitry, which is not shown and which forms no part of the present invention, when the second check parity bit CP-B bit is in a logical zero state and the syndrome (S) includes at least one non-zero bit. When the CP-B bit is in a logical one state, and the syndrome (S) comprises all logical zero state bits then the CP-B bit is in error, and the circuitry 82 sends respective signals on respective lines 84 and 86 respectively indicating that there are no errors in either the data signals (d) or in the MIER signal (M). If the CP-B bit is in a logical zero state and the syndrome (S) includes all logical zero state bits, then the circuitry 82 provides respective signals on respective lines 84 and 86 respectively indicating that there are no errors in either the data signals (d) or in the MIER bit (M).

When the second check parity bit (CP-B) is in a logical one state and the syndrome (S) includes one or more logical one state bits, then there is a correctable single bit error in the MIER bit (M), in the data signals (d) or in the check bits of the second set (C2). If the syndrome includes bits in the following logical sequence: 110000, then the MIER bit (M) is in error; reading down the row of the array of FIG. 2 directly beneath the MIER bit, it will be appreciated that this syndrome bit sequence corresponds to "X's" appearing only in the top two rows under the MIER bit. In the case where the MIER bit is in error, the ECC control circuitry 82 provides on lines 86 signals causing the MIER bit toggling circuitry 74 to toggle the erroneous MIER bit (M) so as to correct its erroneous logical state.

When the second check parity bit (CP-B) is in a logical one state, and the syndrome (S) includes more than one bit in a logical one state (and the syndrome does not comprise the sequence 110000), then a bit from the checking block of data signals (d) is in error. For example, the syndrome (S), comprising a bit sequence 110011, indicates that data bit 0 of the byte III is in error. This can be determined from the array of FIG. 2 by noting that the column of the array directly under bit 0 of byte III includes "X's" only in rows zero, one, four and five. In the case where there is a single bit data error, the ECC control circuitry 82 provides on lines 84 signals causing the data bit toggling circuitry 66 to toggle the erroneous data bit so as to correct its erroneous logical state.

When the second check parity bit (CP-B) is in a logical one state, and the syndrome (S) includes only one bit in a logical one state, then a check bit from the second set (C2) is in error. For example, the syndrome 000100 indicates that check bit C2-3 is in error. This can be determined from the array of FIG. 2 by noting that the column directly under C2-3 includes an "X" only in row three.

Once the ECC control circuitry 82 has provided respective signals on respective lines 84 and 86 either indicating that there are no correctable errors in the data or MIER signals or causing respective circuits 66 or 74 to correct erroneous bits, the data signal toggling circuitry 66 provides the data signals (d) (including any bits which have been toggled) to the first check bit generating circuitry 20, and the MIER bit toggling circuitry 74 provides the MIER bit (M) (whether toggled or not) to the MIER bit reporting circuitry 76.

The first check bit generating circuitry 20 once again generates a first set of check bits (C1) to cover the data signals. The MIER bit reporting circuitry 76 reports on line 78 to diagnostic circuitry, which is not shown and which forms no part of the present invention, the logical state of the MIER bit (M). As discussed above, the logical state of the MIER bit provides a record of uncorrectable errors which occurred either while the data signals were stored in the op-cache 12 or in the course of their transfer from the op-cache 12 to the main storage array 14.

As described more fully in the aforementioned CACHE MOVE-IN BYPASS application, the data from the opcache 12 to the CPU 18 passes through a data selector 302 in the SU 11, the second input of which is coupled to the output of SDR latch point 67. The path 304 which couples the second input of data selector 302 to the SDR latch point 67 is a bypass data path internal to the SU 11, which bypasses data bit toggling circuitry 66, all the ECC circuitry associated with the opcache 12, as well as the opcache 12 itself. Thus the CPU 18 may begin using data from SDR latch point 67 as soon as possible following its arrival from the MSU 13. Only if an error is reported by ECC control circuitry 82 will the SU 11 notify the CPU 18 to abort its processing and request the data again. By that time the corrected data (if the error was correctable) will have been written into opcache 12, and the SU 11 will not need to request it again from the MSU 13.

It should be noted that ECC control circuitry 82 is combinational in nature, so the error signals on lines 84 are presented to SU 11 on the clock cycle after the syndrome (S) was latched in syndrome latch point 81. Since the syndrome is latched in syndrome latch point 81 on the same cycle that the data to which it corresponds is latched in SDR latch point 67, it will be apparent that the error signals are made available to the SU 11 on the clock cycle immediately following the clock cycle that the data to which they correspond are made available to the SU 11 on lines 64.

The reporting of an uncorrectable error in the data signals (d) either by the ECC control circuitry 82 on line 83 or by the MIER bit reporting circuitry 76 on line 78 will cause the process control circuitry 16 to disable the transfer of the data signals (d) to the op-cache 12. Since the source of the uncorrectable error in the data signals (d) generally can be traced to either the move-out from the op-cache 12 (in which case an MIER error is reported on line 78) or to storage in the main storage unit 16 (in which case an uncorrectable error is reported on line 83), diagnostic processes directed to diagnosing the source cause of the error are simplified. Therefore, the apparatus and method described above permits the more efficient detecting and reporting of data signal errors occurring either in the op-cache 12 or in the course of data signal transfer from the op-cache 12 to the main storage array 14.

Figure 5:
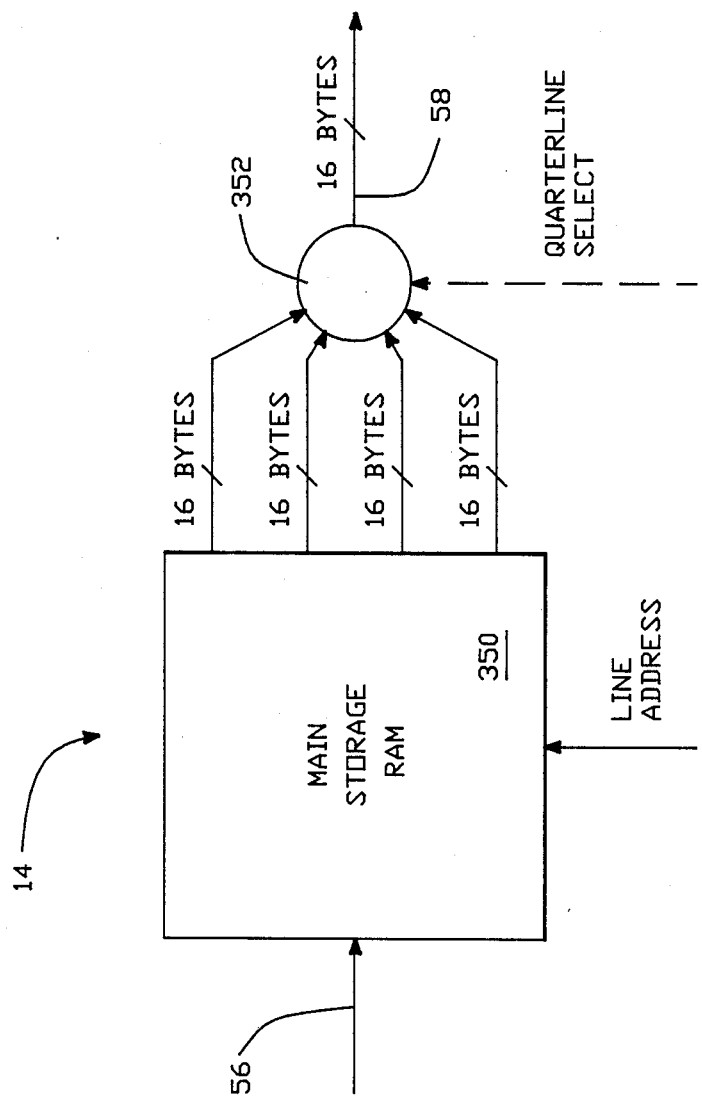
FIG. 5 shows the main storage array 14 of FIG. 1 in more detail.

When the CPU 18 requests an operand from the SU 11, and the SU 11 determines that the requested operand is not in the opcache 12, the SU 11 requests from the MSU 13 the entire 64-byte line of data which contains the requested operand. The MSU 13 provides this data in a series of four flows, one 16-byte quarterline per flow. Referring to FIG. 5, it can be seen that the main storage array 14 comprises a main storage RAM 350 and a four-input data selector 352. When data is to be read from the main storage array 14, process control circuitry 16 (FIG. 1) provides the line address of the data to the main storage RAM 350. The main storage RAM 350 provides the full 64-byte line to the data selector 352, which selects one quarterline at a time for output on data path 58 and latching in SDRM1 latch point 71 (FIG. 1). All four quarterlines are output onto data path 58, but the sequence is controlled by process control circuitry 16 to provide first the quarterline which contains the operand requested by the CPU 18. The remaining quarterlines follow in a sequence determined by process control circuitry 16.

Figure 4:
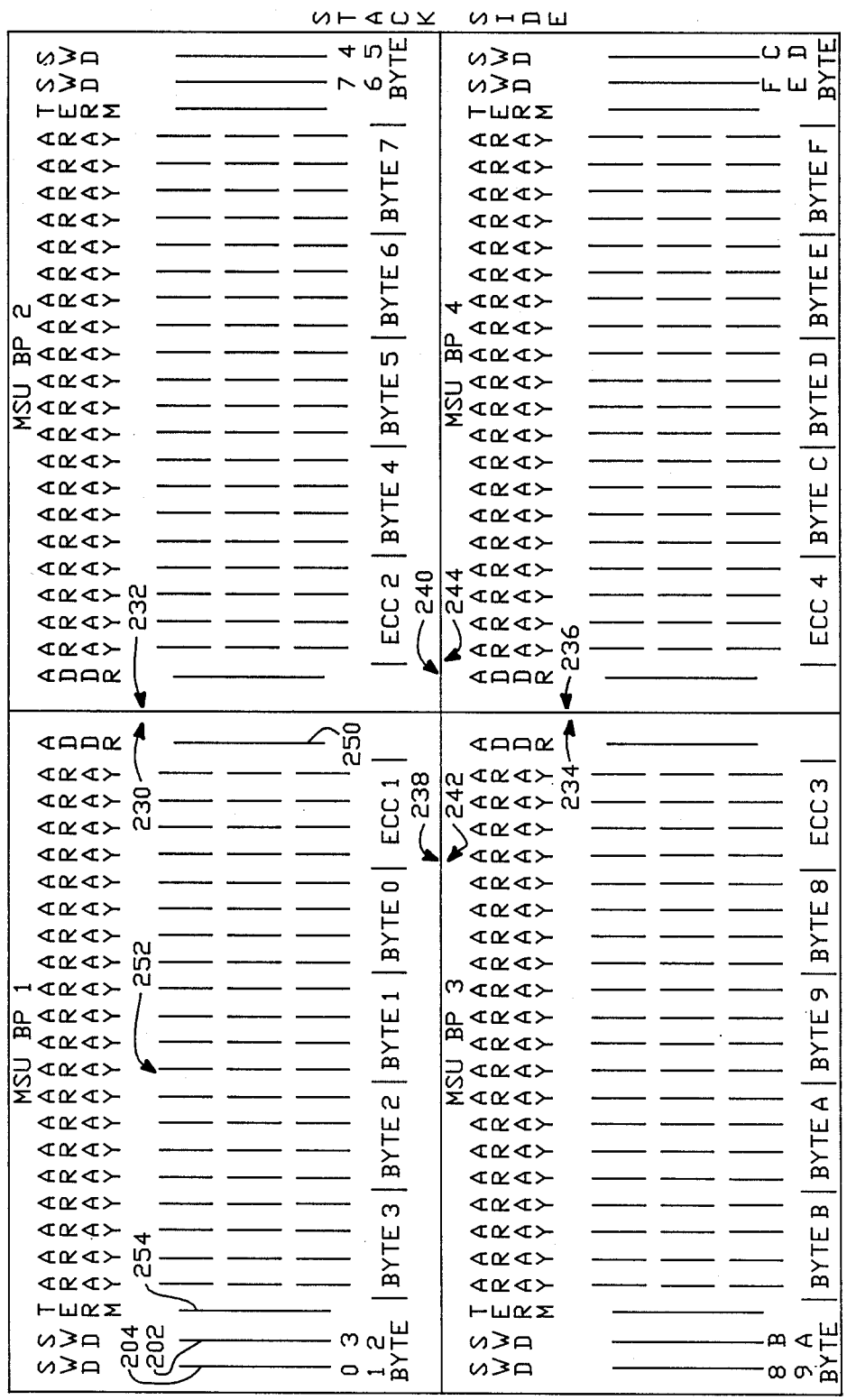
FIG. 4 shows the physical arrangement of the backplane of a data storage unit.

FIG. 3 shows how one of the XOR trees shown in FIG. 2 may be implemented. The implementation divides the tree onto two separate cards, but the tree may equally well be implemented on one card or on many cards as long as they are physically close to each other in order to minimize the length of cross-coupling cables passing between them. As shown in FIG. 4 and described below, the two cards shown in FIG. 3 are adjacent to each other in the backplane.

Referring to FIG. 3, there is shown a pair of switch data cards 202 and 204. The circuitry shown thereto fully implements the generation of the C2-4 ECC bit for the four-byte checking block containing bytes 0, I, II, and III of an incoming flow of data. The partial XOR required for bytes 0 and I is generated on card 202 and the partial XOR for bytes II and III is generated on card 204. The two partial XOR's are themselves XORed with each other on card 204 in order to generate the C2-4 ECC bit. Three more pairs of switch data cards (shown only in FIG. 4) similar to 202 and 204 are provided for generating ECC code bits for respectively the three other checking blocks in a flow (not shown).

Referring to card 202, eight XOR gates, labelled 210a through 210h, are shown for performing an XOR operation on ten inputs to generate the one partial XOR output 212 for bytes 0 and I in the checking block. The ten inputs are bits 0, 2, 3, 5, and 6 of each of bytes 0 and I. This corresponds to the information shown in FIG. 2 in the row labelled C2-4.

Similarly, on card 204 there are shown eight XOR gates 214a through 214h which together perform a ten-input XOR operation on bits 0, 2, 3, 5 and 6 of each of bytes II and III of the checking block to generate a partial XOR 216 for bytes II and III. The partial XOR 212 and the partial XOR 216 are connected to the inputs of another XOR gate 218 to generate the C2-4 ECC code bit for the present checking block. Only the partial XOR 212 passes between the two switch data cards 202 and 204.

Not shown, but also present on the cards 202 and 204, are XOR trees for generating all the other ECC code bits for the current checking block as well as circuitry for generating the syndrome bits (see designation 80 in FIG. 1) for outgoing flows of data being transmitted from the main storage unit to a data requestor such as CPU 18. Syndrome generation for the C2-4 bit is performed by another XOR tree similar to that shown in FIG. 3, except that the stored C2-4 value is added in as an additional input to any of the XOR gates shown in FIG. 3.

The physical layout of the main storage unit is shown in FIG. 4. It is divided into four substantially independent sub-units or quadrants, each quadrant storing four of the sixteen bytes of data in any given flow. As will be described, the four bytes in a quadrant correspond to one of the checking blocks referred to above.

FIG. 4 shows a view of the backplanes of the main storage unit, the backplanes being labelled, respectively, BP1, BP2, BP3 and BP4. The right edge 230 of BP1 is adjacent to the left edge 232 of BP2 and the right edge 234 of BP3 is adjacent to the left edge 236 of BP4. The bottom edges 238 and 240 of BP1 and BP2, respectively, are adjacent to the top edges 232 and 234 of BP3 and BP4 respectively.

Referring to backplane BP1, reading from right to left, slots are provided for an address card 250, a memory array 252, an address termination card 254, and the two switch data cards 202 and 204 shown in FIG. 3. The backplane includes slots for other cards as well, not shown, which are not important to the present invention. The memory array 252 contains space for storing bytes 0-3 of any given flow of data, as well as the ECC code covering the checking block comprising bytes 0-3. It is advantageous to place the address card 250 and the switch data cards 202 and 204 at opposite edges of the backplane so that the address and the data travel in the same direction when data is being read from the main storage unit. This assures a substantially constant delay between provision of an address by the address card 250 and arrival of the data at the switch data cards 202 and 204, for all bytes in the checking block. The address and data will travel in directions opposite each other for write operations, but this is unimportant since write time is not as critical a parameter as is read time.

Backplane BP2 is a mirror image of backplane BP1, symmetrical about the right edge 230 of backplane 1 or the left edge 232 of backplane 2. It is advantageous to organize BP2 this way since it permits the address cards to be adjacent to each other. Thus, only one copy of the address need be provided to backplanes BP1 and BP2.

Backplanes BP3 and BP4 are similarly mirror images of each other. The storage array on BP2 stores bytes 4-7 of a given flow, as well as the ECC code covering those bytes as a checking block. The array in BP3 contains data for bytes 8-11 of any given flow as well as the ECC code covering those bytes as a checking block. The array in BP4 stores bytes 12-15 of any given flow of data, as well as the ECC code covering those bytes as a checking block.

Since each of the four ECC checking blocks are distinct from each other, the logic required to generate the ECC codes and to provide error detection and correction in response to such codes is fast enough to operate in a single clock cycle. Additionally, the location of errors is pinpointed since syndrome bits are provided separately for each of the four checking blocks. Moreover, since the four ECC codes covering a flow are independent of each other, they may be generated and checked by four independent modules (having two switch data cards each, as previously described). No cross-coupling is required between the modules. This makes possible the placement of the switch data cards as shown in FIG. 4, i.e., at the far left of the left-hand backplanes BP1 and BP3 and at the far right of the right-hand backplanes BP2 and BP4, thereby permitting read addresses and read data to traverse the storage arrays in the same direction while a minimum number of copies of the address are provided to the main storage unit.

It will be understood that the abovedescribed embodiment is merely illustrative of many possible specific embodiments which can represent the principles of the invention. Numerous and varied other arrangements readily can be devised in accordance with these principles without departing from the spirit and scope of the invention. For example, although in the Amdahl 5890 a "flow" is defined as one quarterline of data, it will be understood that as used herein the only importance of the term is that one entire flow of data is provided by the storage unit on a clock cycle. Thus, the foregoing description is not intended to limit the invention which is defined by the appended claims in which:

What is claimed is:

1. Apparatus for performing error detection and correction in a data storage unit, comprising:
   transmission means for transmitting flow of data to and from said data storage unit, each of said flows including a plurality of distinct blocks of bits of data, said transmission means transmitting in parallel all of the bits in each of said flows;
   means for generating an ECC code for an incoming one of said flows of data incoming to said data storage unit over said transmission means and for storing such ECC code in correspondence with such incoming flow of data; and
   means for detecting and correcting errors in an outgoing one of said flows of data outgoing from said data storage unit over said transmission means, said means for detecting and correcting being responsive to the ECC code stored in correspondence with such outgoing flow of data,
   wherein said means for generating comprises means for providing a plurality of mutually independent ECC sub-codes, each of said ECC sub-codes providing independent error detection and correction capability for a corresponding one of the distinct blocks in such incoming flow of data.

2. Apparatus for performing high-speed error detection and correction, for use in association with a data requestor, comprising:
   a storage unit adapted to provide a requested flow of data to the requestor in a given clock cycle, said storage unit including storage means for storing in the storage unit a flow of data in correspondence with a plurality of mutually independent ECC codes, each such ECC code covering a respective one of a plurality of distinct sets of bits in the flow; and
   error detection and correction means for detecting and correcting errors in a flow of data to be transmitted from the storage unit to the data requestor, comprising means for detecting and correcting errors in each of the plurality of distinct sets of bits in the flow in response to the ECC code stored in the storage unit in correspondence with such distinct set of bits.

3. Apparatus according to claim 2, wherein each flow is 16 bytes wide, wherein each distinct set of bits consists of four of the 16 bytes of the flow, and wherein each ECC code provides double-bit error detection and single-bit error correction capability for one of the distinct sets.

4. Apparatus according to claim 2, further comprising a bypass data path having an input coupled to receive the requested flow of data from the storage means and further having an output couplable to the requestor, for providing to the data requestor the requested flow of data prior to the detection and correction of errors, wherein the error detection and correction means operates quickly enough such that the requested flow of data is available to the requestor from the error detection and correction means no later than the next requestor clock cycle following the requestor clock cycle on which the requested flow of data is available to the requestor from the output of the bypass data path.

5. Apparatus according to claim 2, wherein the storage unit is divided into a plurality of physically separate sub-units, each sub-unit storing one of the distinct sets of bits in a flow and the ECC code covering such one of the distinct sets of bits in the flow.

6. Apparatus according to claim 5, wherein the error detection and correction means is physically divided into a plurality of modules, each module containing the means for detecting and correcting errors in one of the plurality of distinct sets of bits, each module being physically located in the sub-unit storing such one of the plurality of distinct sets of bits.

7. Apparatus for providing high speed error detection and correction in a data storage unit, said data storage unit having at least first and second physically separate and spaced sub-units, said data storage unit further having transmission means for transmitting flow of data to and from said data storage unit, each of said flow including at least first and second distinct sets of bits of data, said transmission means transmitting in parallel all of the bits in each given one of said flows, said first and second subunits storing respectively the first and second distinct sets of bits in each of said flow of data, said apparatus comprising:
  first and second generating means for generating first and second ECC codes over respectively the first and second distinct sets of bits in an incoming flow of data, said first ECC code being stored in said first sub-unit and said second ECC code being stored in said second sub-unit; and
  first and second error detection and correction means for detecting and correcting errors is respectively the first and second distinct sets of bits in an outgoing flow of data, said first error detection and correction means being located physically in said first sub-unit and said second error detection and correction means being located physically in said second sub-unit.

8. Apparatus for providing high speed error detection and correction in a data storage unit, the data storage unit having at least first and second physically separate sub-units, the first and second sub-units storing respective first and second distinct sets of bits of a flow of data, comprising:
  first and second generating means for generating first and second ECC codes over respectively the first and second distinct sets of bits in an incoming flow of data, the first ECC code being stored in the first sub-unit and the second ECC code being stored in the second sub-unit; and
  first and second error detection and correction means for detecting an correcting errors in respectively the first and second distinct sets of bits in an outgoing flow of data, the first error detection and correction means being located in the first sub-unit and the second error detection and correction means being located in the second sub-unit,
  wherein the first and second sub-units have respective first and second backplanes, each backplane having a first edge and a second edge and a storage array located between the first edge and the second edge, the second edge of the first backplane being adjacent to the first edge of the second backplane, a read address being supplied to the data storage unit and traversing the storage array in the first backplane from the second edge to the first edge of the first backplane and traversing the storage array in the second backplane from the first edge to the second edge of the second backplane, the first error detection and correction means being located at the first edge of the first backplane, and the second error detection and correction means being located at the second edge of the second backplane.

9. Apparatus according to claim 8, the data storage unit further having third and fourth physically separate sub-units, the third and fourth sub-units storing respective third and fourth distinct sets of bits of a flow of data, further comprising:
  third and fourth generating means for generating third and fourth ECC codes over respectively the third and fourth distinct sets of bits in an incoming flow of data, the third ECC code being stored in the third sub-unit and the fourth ECC code being stored in the fourth sub-unit; and
  third and fourth error detection and correction means for detecting and correcting errors in respectively the third and fourth distinct sets of bits in an outgoing flow of data, the third error detection and correction means being located in the third sub-unit and the fourth error detection and correction means being located in the fourth sub-unit.

10. Apparatus for performing high-speed error detection and correction on data to be supplied from a data storage unit, the data to be supplied in n-byte flows, the data storage unit being physically divided into first, second, third and fourth quadrants, the quadrants storing respective first, second, third and fourth n/4-byte segments of each flow, the first, second, third and fourth quadrants having respective first, second, third and fourth backplanes, each backplane having a first edge and a second edge, the second edge of the first backplane being adjacent to the first edge of the second backplane and the second edge of the third backplane being adjacent to the first edge of the fourth backplane, an address being supplied to the data storage unit and traversing the first and third backplanes from the second edge to the first edge and traversing the second and fourth backplanes from the first edge to the second edge, the apparatus comprising:
  first, second, third and fourth ECC generating circuits for generating respective first, second, third and fourth ECC codes over respectively the first, second, third and fourth segments of incoming flows of data and storing such ECC codes in the respective first, second, third and fourth quadrants; and
  first, second, third and fourth error detecting and correcting circuits for detecting and correcting errors in respectively the first, second, third and fourth segments of outgoing flows of data, the first and third error detecting and correcting circuits being located at the first edge of respectively the first and third backplanes and the second and fourth error detection and correction circuits being located at the second edge of respectively the second and fourth backplanes.

11. A main storage unit for a data processing system, the main storage unit storing a flow of data in correspondence with an ECC and providing the flow to a requestor in response to a request insured by the requestor, comprising:
  storage means for providing the flow to the requestor in response to the request; and
  error detection means for detecting errors in the flow of data by reference to the ECC stored in correspondence with the flow, and for generating an error signal indicative of whether an error was detected, the error detection means providing the error signal at least one clock cycle after the storage means provides the flow of data so that the flow is available to the requestor at least one clock cycle earlier than the error signal;

wherein the ECC includes error correction capability, and wherein the error signal includes an indication of whether a correctable error was detected and if so which data bits were in error.

12. A storage unit for a data processing system, the storage unit being adapted to provide a requested flow of data to a request or on a given clock cycle, comprising:

means for storing in the storage unit a flow of data in correspondence with a plurality of mutually independent ECC codes, each such ECC code including error correction capability and covering a respective one of a plurality of distinct sets of bits in the flow;

data path means for providing the flow to the requestor on the given clock cycle; and error detection means for detecting errors in the flow of data and for generating with respect to each of the plurality of distinct sets of bits in the flow a first signal indicative of whether a correctable error was detected and a second signal indicative of which of the data bits in the flow were in error, the error detection means providing the first and second signals to the requestor one clock cycle after the means for storing provides the flow of data.

13. A storage unit according to claim 12, wherein the data path means provides a plurality of flows of data in response to the request, each flow being provided at least one clock cycle after the previous flow, the first flow being provided on the given clock cycle, and wherein the error detection means provides the first and second signals for each flow of data one clock cycle after the flow to which the first and second signals correspond, and wherein each flow is 16 bytes wide, each distinct set of bits consists of 4 of the 16 bytes of the flow, and each ECC provides two-bit error detection and one-bit error correction capability for one of the distinct sets.

* * * * *